United States Patent Office 2,981,592
Patented Apr. 25, 1961

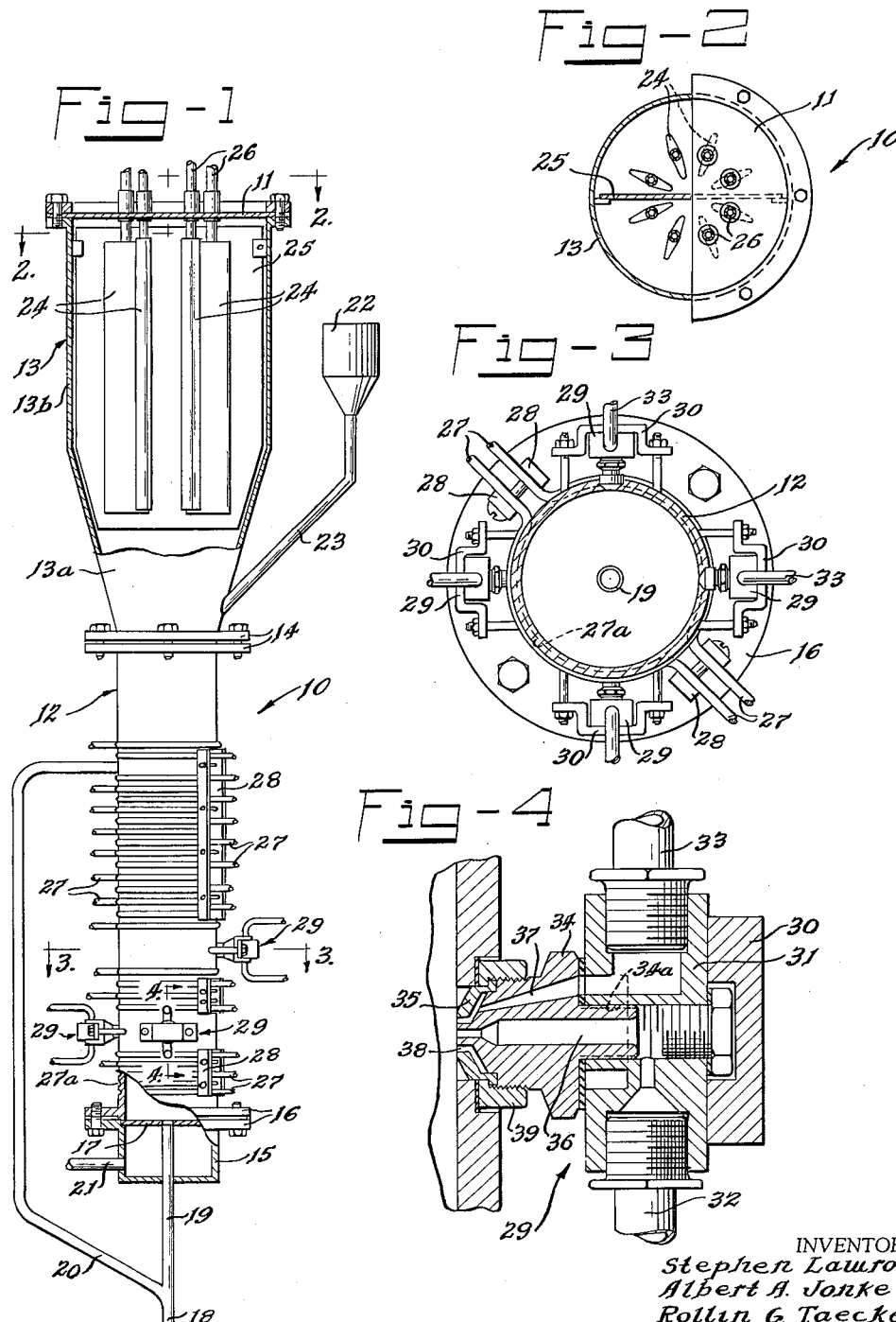

2,981,592
METHOD AND APPARATUS FOR CALCINING SALT SOLUTIONS

Stephen Lawroski, Naperville, Albert A. Jonke, Elmhurst, and Rollin G. Taecker, Naperville, Ill., assignors to the United States of America as represented by the United States Atomic Energy Commission Filed May 13, 1957, Ser. No. 658,901

1 Claim. (Cl. 23—14.5)

This invention relates to a method of and an apparatus for simultaneously evaporating and calcining metallic salt solutions. In particular, the invention relates to a method of and apparatus for dehydrating and denitrating uranyl nitrate hexadydrate to form uranium trioxide.

In order to accomplish this result the fluidized bed principle is employed. Fluidization may be described briefly as the phenomenon which occurs when a gas passes upwardly through a bed of solid particles at sufficient velocity to prevent the particles from remaining in intimate contact with one another. In this condition a certain degree of freedom to move is imparted to the solid particles. In the fluidized state the solid-gas phase behaves much like a liquid having the ability to flow readily under the influence of a hydrostatic head.

The use of the fluidized bed technique has significant advantages in reactions involving gas and a finely divided solid. These advantages may be summarized as follows: (1) the mobility of the fluidized solids permits ready transfer of solids to and from a reaction vessel, thereby permitting continuous operation; (2) excellent temperature control is obtainable; (3) high heat transfer coefficients are obtained between the solid particles and a heating or cooling surface; and (4) high reaction rates are obtained because of the large surface area of the fluidized particles.

Although fluidized solid procedures have been employed widely in industry in many different applications, so far as is known no satisfactory process involving introduction of a solution directly into a fluidized bed has been described. This may be because a liquid introduced into a fluidized bed has a tendency to form agglomerates or lumps within the bed, may eventually clog the feed means, and may even destroy the bed. Normal procedure in carrying out fluidized bed processes has been to introduce feed into the bed as a solid. Obviously many of the advantages of the fluidized bed process would be lost if it were necessary to reduce a solution to dryness before it is introduced into the bed. We have found that fluidized beds may be operated with a solution feed provided that the feed is in a particular location and in a particular manner to be described in detail hereinafter.

The invention is particularly applicable to the dehydration and calcination of uranyl nitrate hexahydrate according to the equation

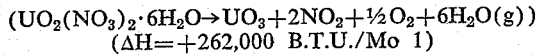

(ΔH=+262,000 B.T.U./Mo 1)

which is one step in the commercial process for the transformation of uranium ore to uranium metal. Present commercial processes for the processing of uranium ore are batch processes. It would be highly desirable to formulate a complete continuous process for this transformation. By the use of the fluidized bed technique according to this invention uranyl nitrate hexahydrate may be reduced to dryness and calcined to uranium trioxide in a form which may then be continuously reduced to uranium dioxide and fluorinated to $UF_4$. The $UF_4$ may then be converted to the metal by conventional procedures. The reduction and fluorination steps may also be carried out using the fluidized bed technique employing the apparatus described and claimed in application Serial No. 653,722, filed April 18, 1957, now Patent No. 2,911,290.

It is an object of the present invention to provide a method for the thermal decomposition of salts contained in solution.

It is also an object of the present invention to provide a method for simultaneously dehydrating and calcining uranyl nitrate hexahydrate to form uranium trioxide.

It is also an object of the present invention to provide an apparatus for simultaneously dehydrating and calcining salt solutions.

These and other objects of the present invention are accomplished by employing a pneumatic atomizing spray nozzle to spray a solution of a salt horizontally into a fluidized bed formed of oxides of the elements contained in the solution thereby simultaneously evaporating the solution and calcining the salt. The spray nozzle found most useful introduces air and the feed solution separately into the bed so that the feed solution is atomized by the air actually within the fluidized bed rather than within the nozzle.

The invention will now be described with reference to the accompanying drawing wherein Fig. 1 represents a vertical view partially broken away of our improved fluidized bed calciner;

Fig. 2 represents a horizontal view taken along the lines 2—2 of Fig. 1;

Fig. 3 represents an enlarged vertical sectional view taken along the lines 3—3 of Fig. 1; and Fig. 4 represents a greatly enlarged cross sectional view of a spray nozzle showing its manner of attachment to the column.

In the drawing a column 10 has a top 11, a reaction section 12 of relatively narrow cross section, and a disengaging section 13 which includes a tapering portion 13a and a portion of greater cross section 13b, said reaction section 12 and disengaging section 13 being joined at flanges 14. A gas inlet section 15 is joined to reaction section 12 at flanges 16. A gas diffusion disk 17, held in place between flanges 16, separates the interiors of reaction section 12 and gas inlet section 15. A product delivery conduit 18 has one branch 19 which extends vertically through the bottom of gas inlet section 15 and gas diffusion disk 17, and another branch 20 which communicates with the interior of the column 10 in the upper portion of the reaction section 12. A gas inlet pipe 21 leads into gas inlet section 15, and a charge hopper 22 communicates with the interior of column 10 through conduit 23.

Disengaging section 13 contains a plurality of filters 24 divided into two banks by a baffle 25. Gas outlet pipes 26 communicate with the interior of filters 24 and lead to a stack (not shown). One bank of filters may be used at a time while a flow of gas is passed in reverse through the other bank to remove the dust collected thereby.

Column 10 is heated by a plurality of tubular electric heaters 27 which are set into grooves 27a in the wall of the column 10 and which are held in place by brackets 28.

A plurality of atomizing spray nozzles 29 having a spray angle of approximately 20° are set into the column walls and held in place there by brackets 30. The nozzles 29 are located in two horizontal planes. A pair of nozzles, spaced at 90° intervals about the circumference of the column 10, are located in one plane and another pair of nozzles, spaced 90° apart and 90° from each of the first pair of nozzles, are located in the second plane. The spray nozzles are shown in detail in Fig. 4 of the drawing.

The nozzle 29 comprises an inlet section 31 having separate inlets 32 and 33 for feed and air respectively, a fluid nozzle 34, and an air nozzle 35. The fluid nozzle 34 has a centrally located conduit 36 extending therethrough and screws into the inlet section 31 at 34a so that the conduit 36 is in communication with feed inlet 32. Fluid nozzle 34 also has a slot 37 extending entirely therethrough which affords a pasageway for air from air inlet 33 to air nozzle 35.

Air nozzle 35 has a central aperture 38 and is attached to the end of the fluid nozzle 34 and held in spaced relationship thereto by means of a threaded coupling 39 with the tip of the fluid nozzle 34 extending through the aperture 38 in the air nozzle 35. As is seen in Fig. 4, the outlet from the fluid nozzle 34 and the outlet from the air nozzle 38 are in the same vertical plane and are flush with the inner surface of the column 10 so that no part of the nozzle extends into the column. In use feed solution is introduced into inlet 32 of nozzle 29 and passes through conduit 36 to the interior of column 10 in the form of a jet. Air is introduced into inlet 33 and passes through slot 37 into the space between air nozzle 35 and fluid nozzle 34 and eventually into column 10. As the feed solution leaves conduit 36 in the form of a jet, air impinging on it from every side atomizes the feed solution. Thus the solution is atomized actually within column 10 rather than in the interior of nozzle 29.

To operate the device the reaction section 12 is filled to a point above the spray nozzles 29 with granular particles between 20 and 200 mesh in size. A heated gas is passed into gas inlet section 15 through gas inlet pipe 21. The flow rate of the fluidizing gas must be high enough to produce vigorous turbulence and mixing of the solid particles. A flow rate of gas which is about ten times the minimum rate required to cause fluidization of the solid particles has been found satisfactory. The gas passes through diffusion disk 17 and up through the particles in the column 10 causing the mass of particles to behave very much as a vigorously boiling liquid. This fluidized bed is heated to the desired operating temperature by heaters 27. The flow of feed solution is then started to the bed. The solution is evaporated and the salts contained therein are calcined to the oxide of the elements contained in the solution by contact with the heated particles in the bed. As the oxide is produced it is withdrawn through either branch 18 or 20 of product delivery conduit 19. The gas carrying the vaporizable portion of the feed rises and passes through filters 24 which remove entrained solids from the gas. The gas may then be passed through a condenser (not shown) and the noncondensible gases evaporated to the atmosphere.

As has been stated before, a process and apparatus according to the present invention is particularly applicable to the dehydration and denitration of uranyl nitrate hexahydrate. Experiments made to show the effectiveness of the process will now be described.

The experiments were carried out in a unit which is constructed of type 304 stainless steel and is 6 inches in diameter in the reaction section 12 and 12 inches in diameter in the disengaging section 13. The overall height of the unit from bottom of gas chamber to top of disengaging section is 64 inches. Branch 20 of product delivery conduit 19 is located 24 inches above diffusion disk 17. Two pneumatic atomizing spray nozzles 29 are mounted horizontally through openings in the side of the reaction section 12 6 inches from the bottom of the bed with the tip of the nozzle flush with the wall of the reactor. Although provision is made for two additional spray nozzles 6 inches above the first two nozzles, they were not employed in these tests. The reactor is heated by thirty 1000-watt tubular electrical heaters. The disengaging section contains 8 porous stainless steel filters for filtering dust particles from the off gas. Each filter is 18 inches long, 3 inches wide and ⅝ inch thick, and has a mean pore diameter of 10 microns. The filters are divided into two banks separated by a baffle, one bank being used to filter the off gas while the other bank is flown back to remove the dust cake.

The reactor was filled from charge hopper 22 with uranium trioxide particles obtained from a previous run to a point above the location of the feed nozzles. The usual amount of uranium trioxide employed to charge the reactor was 55 pounds. In most cases the starting bed was first screened through a 40-mesh screen to remove coarse particles. The flow of preheated fluidizing air was started and the bed was brought up to the desired temperature by means of the electrical heaters. Water was then pumped through the spray nozzles at a low flow rate to check the operation of the nozzles. After a few minutes of steady operation the flow of water was stopped and the uranium nitrate feed solution was started. The feed rate and heat input were then adjusted to the desired values. The feed solution was a 2.4 molar solution of uranyl nitrate. Since uranium trioxide was produced in the reaction the bed level was maintained constant by removing some oxide at frequent intervals through branch 18 of product delivery conduit 19. Table I gives the operating conditions for these runs.

TABLE I

*Operating conditions for denitration runs*

| Run Number | 47 | 49 | 50 | 51 | 52 | 53 |
|---|---|---|---|---|---|---|
| Bed temperature, °C | 390 | 390 | 440 | 350 | 350 | 310 |
| Fluidizing air, ft./sec | 1.3 | 1.3 | 1.3 | 1.3 | 1.3 | 1.3 |
| Nozzle air, p.s.i.g | 25 | 26 | 27 | 26 | 26 | 26 |
| Bed height, inches [1] | 20 | 20 | 20 | 20 | 20 | 20 |
| Feed rate, ml./min | 226 | 230 | 220 | 235 | 230 | 230 |
| UO₃ production, lb./hr | 20 | 21 | 20 | 21 | 21 | 21 |
| Number feed nozzles | 2 | 1 | 1 | 1 | 1 | 1 |
| Heat input, kw.[2] | 17 | 16 | 17 | 16 | 15 | 15 |
| UO₃ recycle rate, percent | 20 | 20 | 20 | 20 | 0 | 0 |
| Run duration, hr | 13.6 | 8.0 | 8.0 | 8.0 | 8.0 | 8.0 |

[1] Approximate bed height after fluidization.
[2] Values reported represent electrical input to heaters.

Air was the fluidizing gas in the above-described runs. It will be understood that 100% uranyl nitrate hexahydrate may be used as feed in place of the 2.4 molar solution (approximately 70% uranyl nitrate hexahydrate) used in the runs.

Use of the feed nozzles in the manner described resulted in a complete lack of caking both within the bed and at the nozzle outlet. Prior to the development of the specific arrangement shown other methods of introduction of the feed were tried. It was found that spraying of the feed solution on the top of the bed or up through the diffusion disk is not satisfactory as both arrangements resulted in severe caking. In addition, it was found that a small cake formed around the nozzle when nozzles of the pressure feed type, that is, nozzles in which liquid is supplied under pressure and atomization occurs internally, were used. The type nozzle found to give the best results and without caking is known as a siphon type nozzle. With this type nozzle atomization occurs externally, that is, the air and liquid are mixed after leaving the nozzle.

Agglomeration or lumping of the solid particles upon introduction of the feed liquid is minimized by this invention for the following reasons. The turbulence of the fluidized bed together with the atomization of the liquid tends to distribute the liquid uniformly among the solid particles. Moreover the atomizing gas emerging from the spray nozzle with the liquid feed increases the agitation of the solids in the vicinity of the spray zone, thereby aiding in the uniform distribution of the liquid droplets among the solid particles. Because the bed is in an expanded condition and the particles are not directly in contact with each other, the liquid droplets emerging from the nozzle at high velocity are able to penetrate several inches into the bed thereby contacting solid particles which are not in the immediate vicinity of the nozzle tip. Since the liquid droplets are appreciably smaller than the solid particles, the droplets upon contacting the hot solid particles are very rapidly evaporated or decomposed, thus minimizing the opportunity for solid particles to cement together.

Analyses of the product samples are given in Table II below. The residual nitrate content was less than .6% and the residual water content was less than .2% in all cases. The bulk density was high and a negligible amount of $U_3O_8$ was present in the product.

TABLE II

*Results of chemical and physical analyses of product from denitration runs*

| Analysis | Run No. | | | | | |
|---|---|---|---|---|---|---|
| | 47 | 49 | 50 | 51 | 52 | 53 |
| $UO_3$, percent | 98.1 | 99.8 | 99.3 | 99.4 | 99.5 | 99.4 |
| $NO_3$, percent | 0.40 | 0.50 | 0.41 | 0.43 | 0.53 | 0.50 |
| $H_2O$, percent | 0.18 | 0.11 | 0.08 | 0.12 | 0.18 | 0.15 |
| $U_3O_8$, percent | 0.04 | 0.05 | 0.04 | 0.05 | 0.07 | 0.22 |

Since it is essential that the product be extremely pure from a nuclear standpoint spectographic analyses of the feed solution and of the product were made. No detectible increase in the amount of iron, nickel or chromium were found in the product.

For satisfactory operation of the process it is important that the particle size of the uranium trioxide in the reactor remain within suitable limits. Large amounts of coarse particles or large amounts of very fine particles are undesirable. It is necessary therefore that both the average size and the size distribution reach a suitable equilibrium value during the period of operation and thereafter remain constant. In the early runs a net increase in particle size occurred. Apparently, therefore, small particles were not being produced at a rate sufficient to counteract particle growth. In order to counteract this effect fine particles were separated from the product and recycled back to the fluidized bed to act as new nuclei for the deposition of uranium trioxide from the feed. Runs 47, 49, 50 and 51 were made with recycling.

Later it was found that operating variables could be controlled in such a manner as to attain a steady state. The operating temperature was found to have a surprisingly large effect on the particle size of the product as shown in Table III.

TABLE III

*Effect of temperature on the particle size of product from denitration runs*

| Run No. | Bed Temp., °C. | $UO_3$ Recycle Rate, Percent | Sieve Analysis at Steady State (Percentage in each size range-mesh) | | | |
|---|---|---|---|---|---|---|
| | | | +40 | −40, +100 | −100, +200 | −200 |
| 50 | 450 | 20 | 30 | 37 | 22 | 11 |
| 49 | 400 | 20 | 19 | 38 | 32 | 11 |
| 51 | 350 | 20 | 18 | 28 | 42 | 12 |
| 52 | 350 | None | 19 | 38 | 33 | 10 |
| 53 | 310 | None | 13 | 36 | 45 | 6 |

At the higher temperatures a larger percentage of coarse particles are formed. The percentage of fine particles (100–200 mesh) was over twice as large at 310° C. as at 450° C. under otherwise comparable conditions. Because of the gerater percentage of fine particles formed at the lower temperatures the necessity for recycling fine particles to the fluidized bed is eliminated. In runs 52 and 53 a steady state particle size was attained without recycling by using bed temperatures of 350° and 310° C. respectively. Since the effect of temperature in the range of 450° to 310° C. on the extent of denitration and dehydration is small, it is concluded that the optimum temperature to employ is at the lower end of the range. The elimination of the necessity for recycling fine particles represents an important simplification of the process. The particle size distribution reaches equilibrium several hours after either alternative is employed.

It was noted that the percentage of coarse particles in the product at steady state increased with the feed rate per nozzle. A definite but small increase in coarse particles resulted from increasing the volume of feed introduced from each nozzle. Although feed flow rates lower than those shown in the illustrative examples give better results from the standpoint of particle size, the test results show that feed flow rates increased to the rate shown may be tolerated and are of course preferable from the production standpoint. No noticeable effect on the residual nitrate or water content of the product was observed as a result of varying the feed rate.

The location of the nozzles relative to the bottom or top of the bed is of minor importance. However, they should be mounted more than four inches from the top and bottom of the bed. It is important that the nozzles be mounted horizontally with the tip flush with the inner wall of the reactor since this type of mounting helps to prevent caking around the nozzle.

Although the specific tests shown did not require its use the alternative branch pipe 20 is most useful. The branch pipe 18 may be closed completely and the bed permitted to overflow through pipe 20. Thus we have completely automatic control over the level of the bed in the column. Obviously, also both branches 20 and 18 of the outlet pipe 19 may be used together if so desired.

It will be understood that this invention is not to be limited to the details given herein but that it may be modified within the scope of the appended claim.

What is claimed is:

A method for thermally decomposing uranyl nitrate hexahydrate comprising establishing and maintaining a fluidized bed of $UO_3$ particles by passing a fluidizing gas vertically through a body of said particles, feeding the uranyl nitrate hexahydrate in an aqueous solution of 2.4 molar concentration at the rate of about 230 milliliters per minute horizontally into the bed below the surface thereof by forming a jet of said solution exteriorly to the bed, impinging a coaxial air jet of about 26 p.s.i.g. on the solution jet within the bed adjacent to the point of introduction thereof whereby the solution is atomized within the bed, heating the bed to a temperature between 210° and 350° C. while introducing the fluidizing gas at a rate approximately ten times that necessary to fluidize the bed, and removing the $UO_3$ product from the bed.

References Cited in the file of this patent

UNITED STATES PATENTS

| | | |
|---|---|---|
| 1,920,632 | Daniels | Aug. 3, 1931 |
| 2,025,402 | Saint-Jacques | Dec. 8, 1933 |
| 2,155,119 | Ebner | Apr. 18, 1939 |
| 2,642,339 | Sawyer | June 16, 1953 |
| 2,678,257 | Polissar | May 11, 1954 |
| 2,714,550 | Miller | Aug. 2, 1955 |
| 2,757,072 | Kapp et al. | July 31, 1956 |
| 2,777,755 | Eberhardt | Jan. 15, 1957 |
| 2,790,701 | Kamen | Apr. 30, 1957 |

OTHER REFERENCES

Chem. Eng. Prog., vol. 49 (1953), pp. 113–119, 455–458 and 527–532; vol. 51 (1955), pp. 167–173. (Copy in Scientific Library.)

Jonke et al.: Nuclear Science and Eng., vol. 2, May 1957, pp. 303–319. (Copy in Scientific Library.)

Katz et al.: Chemistry of Uranium NNES VIII–5, pp. 319 and 320 (1951), McGraw-Hill Book Co., Inc., New York. (Copy in Scientific Library.)

Perry: Chemical Engineers' Handbook (1950), pp. 1173 and 1174, McGraw-Hill Book Co., Inc., New York. (Copy in Scientfic Library.)